United States Patent
Tang (10) Patent No.: US 10,931,555 B2
(45) Date of Patent: Feb. 23, 2021

(54) COMMUNICATION METHOD AND COMMUNICATION DEVICE FOR ACQUIRING LATENCY

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/082,923

(22) PCT Filed: May 11, 2016

(86) PCT No.: PCT/CN2016/081716
§ 371 (c)(1),
(2) Date: Sep. 6, 2018

(87) PCT Pub. No.: WO2017/193308
PCT Pub. Date: Nov. 16, 2017

(65) Prior Publication Data
US 2019/0089614 A1 Mar. 21, 2019

(51) Int. Cl.
*H04L 12/26* (2006.01)
*H04W 28/06* (2009.01)
(Continued)

(52) U.S. Cl.
CPC ........ *H04L 43/106* (2013.01); *H04L 43/0858* (2013.01); *H04W 28/06* (2013.01);
(Continued)

(58) Field of Classification Search
CPC .............. H04L 43/106; H04W 28/06; H04W 56/0045; H04W 72/1236
See application file for complete search history.

(56) References Cited

U.S. PATENT DOCUMENTS 9,763,131 B2 * 9/2017 Han ................ H04W 72/1236
2007/0274227 A1 * 11/2007 Rauscher ............ H04L 43/0858
370/252
(Continued)

FOREIGN PATENT DOCUMENTS

| CN | 1855935 A | 11/2006 |
| CN | 101001179 A | 7/2007 |

(Continued)

OTHER PUBLICATIONS

International Search Report in international application No. PCT/CN2016/081716, dated Jan. 26, 2017.
(Continued)

*Primary Examiner* — Walli Z Butt
*Assistant Examiner* — Ryan C Kavleski
(74) *Attorney, Agent, or Firm* — Ladas & Parry, LLP (57) ABSTRACT

Provided are a communication method and a communication device, capable of accurately obtaining a time delay between devices. The method comprises: a sending end adds time indication information to a sending packet, the time indication information being used for a receiving end to obtain a time delay from the sending end to the receiving end; and the sending end sends the sending packet to the receiving end.

18 Claims, 2 Drawing Sheets

(51) Int. Cl.
*H04W 56/00* (2009.01)
*H04W 72/12* (2009.01)
*H04W 80/02* (2009.01)

(52) U.S. Cl.
CPC ... *H04W 56/0045* (2013.01); *H04W 72/1236* (2013.01); *H04W 80/02* (2013.01)

(56) References Cited

U.S. PATENT DOCUMENTS

| | | | |
|---|---|---|---|
| 2008/0159258 | A1 | 7/2008 | Ji |
| 2011/0273995 | A1 | 11/2011 | Ahn |
| 2012/0263195 | A1 | 10/2012 | Li |
| 2013/0077509 | A1* | 3/2013 | Hirota ............ H04L 43/106 370/252 |
| 2013/0121347 | A1* | 5/2013 | Saito ............ H04J 3/0697 370/474 |
| 2014/0010094 | A1* | 1/2014 | Robitaille ............ H04L 43/0858 370/252 |
| 2014/0301215 | A1 | 10/2014 | Somoskoi et al. |
| 2014/0341068 | A1 | 11/2014 | Robitaille et al. |
| 2015/0289176 | A1* | 10/2015 | Liu ............ H04W 24/02 370/331 |
| 2017/0289011 | A1 | 10/2017 | Johnsson et al. |

FOREIGN PATENT DOCUMENTS

| | | |
|---|---|---|
| CN | 101336520 A | 12/2008 |
| CN | 101488892 A | 7/2009 |
| CN | 101523829 A | 9/2009 |
| CN | 102106171 A | 6/2011 |
| CN | 102111380 A | 6/2011 |
| CN | 102647783 A | 8/2012 |
| EP | 2787687 A1 | 10/2014 |
| JP | 2006054779 A | 2/2006 |
| JP | 2006311406 A | 11/2006 |
| JP | 2006340078 A | 12/2006 |
| JP | 2006340081 A | 12/2006 |
| JP | 2010045757 A | 2/2010 |
| JP | 2011041213 A | 2/2011 |
| JP | 2013098759 A | 5/2013 |
| WO | 2008075921 A1 | 6/2008 |
| WO | 2008080263 A1 | 7/2008 |
| WO | 2010074506 A2 | 7/2010 |
| WO | 2011040006 A1 | 4/2011 |
| WO | 2016043633 A1 | 3/2016 |

OTHER PUBLICATIONS

Written Opinion of the International Search Authority in international application No. PCT/CN2016/081716, dated Jan. 26, 2017. English Translation provided by Google.

Supplementary European Search Report in European application No. 16901263.0, dated Dec. 19, 2018.

Written Opinion of the International Search Authority in international application No. PCT/CN2016/081716, dated Jan. 26, 2017, with English translation from WIPO.

International Preliminary rRepot on Patentability from international application No. PCT/CN2016/081716, dated Nov. 13, 2018, with English translation from WIPO.

First Office Action of the Japanese application No. 2018-554370, dated Dec. 13, 2019.

Liu J Yang L Jiang ZTE Corporation G: "Multiprotocol Label Switching Transport Profile Backward Notify Message Packet; draft-liu-mpls-tp-bnm-00. txt", Multiprotocol Label Switching Transport Profile Backward Notify Message Packet; DRAFT-LIU-MPLS-TP-BNM-00. TXT. Internet Engineering Task Force. IETE: StandardWorkingDraft. Internet Society (ISOC) 4, Rue Des Falaises CH-1205 Geneva, Switzerland, Feb. 23, 2009 (Feb. 23, 2009), XP015061530.

First Office Action of the Chinese application No. 201680084001.6, dated Jul. 9, 2020.

First Office Action of the European application No. 16901263.0, dated May 20, 2020.

Second Office Action of the Japanese application No. 2018-554370, dated May 12, 2020.

Third Office Action of the Japanese application No. 2018-554370, dated Jul. 14, 2020.

Office Action of the Indian application No. 201817044403, dated Jul. 29, 2020.

Huawei, HiSilicon; "Low latency and low overhead transmission for NR", 3GPP TSG-RAN WG2 Meeting #93bis, Dubrovnik, Croatia, R2-162662, Apr. 11-15, 2016.

Second Office Action of the Chinese application No. 201680084001.6, dated Sep. 21, 2020.

First Office Action of the Taiwanese application No. 106115042, dated Oct. 16, 2020.

Third Office Action of the Chinese application No. 201680084001.6, dated Dec. 16, 2020.

* cited by examiner

COMMUNICATION METHOD AND COMMUNICATION DEVICE FOR ACQUIRING LATENCY

CROSS-REFERENCE TO RELATED APPLICATION

The present application is the U.S. national phase of PCT Application PCT/CN2016/081716 filed on May 11, 2016, the disclosure of which is hereby incorporated by reference in its entirety.

TECHNICAL FIELD

The disclosure relates to the field of communications, and more particularly to a communication method and a communication device.

BACKGROUND

In a communication technology, latency has great impact on a user experience, and latency reduction is an urgent need of a modern communication technology. However, for latency reduction, latency is required to be accurately acquired at first.

Therefore, an urgent problem to be solved is to accurately acquire latency.

SUMMARY

Embodiments of the disclosure provide a communication method and a communication device, which may accurately acquire latency between devices.

A first aspect provides a communication method. The method may include that: a transmitter adds time indication information into a sending packet, wherein the time indication information may be configured for a receiver to acquire latency from the transmitter to the receiver; and the transmitter transmits the sending packet to the receiver.

In combination with the first aspect, in a first possible implementation mode of the first aspect, the sending packet may be a Packet Data Convergence Protocol (PDCP) packet, a Radio Link Control (RLC) packet or a Media Access Control (MAC) packet.

In combination with the first aspect or any abovementioned possible implementation mode thereof, in a second possible implementation mode of the first aspect, the time indication information may include a starting time of processing the sending packet by the transmitter or include a processing latency of processing the sending packet by the transmitter.

In combination with the first aspect or any abovementioned possible implementation mode thereof, in a third possible implementation mode of the first aspect, before the operation that the transmitter transmits the sending packet to the receiver, the method may further include the following action.

The transmitter determines Quality of Service (QoS) of a service corresponding to the latency from the transmitter to the receiver to be acquired.

The operation that the transmitter transmits the sending packet to the receiver may include the following action.

The transmitter transmits the sending packet to the receiver according to the corresponding QoS.

In combination with the first aspect or any abovementioned possible implementation mode thereof, in a fourth possible implementation mode of the first aspect, the operation that the transmitter transmits the sending packet to the receiver may include the following action.

The transmitter transmits the sending packet to the receiver through multiple paths.

In combination with the first aspect or any abovementioned possible implementation mode thereof, in a fifth possible implementation mode of the first aspect, the sending packet may be a data packet or a probing packet dedicated for latency detection.

In combination with the first aspect or any abovementioned possible implementation mode thereof, in a sixth possible implementation mode of the first aspect, the sending packet may further include at least one of a latency requirement, a receiver list or a feedback object.

In combination with the first aspect or any abovementioned possible implementation mode thereof, in a seventh possible implementation mode of the first aspect, the transmitter may receive a feedback message from the receiver, and the feedback message may be configured to indicate the latency from the transmitter to the receiver or indicate whether the latency from the transmitter to the receiver meets the latency requirement.

In combination with the first aspect or any abovementioned possible implementation mode thereof, in an eighth possible implementation mode of the first aspect, before the operation that the transmitter adds the time indication information into the sending packet, the method may further include the following action.

The transmitter receives configuration information sent by a third-party entity, the configuration information being configured to instruct the transmitter to transmit the sending packet including the time indication information to the receiver.

In combination with the first aspect or any abovementioned possible implementation mode thereof, in a ninth possible implementation mode of the first aspect, the operation that the transmitter transmits the sending packet to the receiver may include the following action.

The transmitter transmits the sending packet to the receiver through a Uu interface or a Device to Device (D2D) interface.

A second aspect provides a communication method, which may include the following operations.

A receiver receives a sending packet sent by a transmitter, wherein the sending packet includes time indication information.

The receiver determines latency from the transmitter to the receiver according to the time indication information.

In combination with the second aspect, in a first possible implementation mode of the second aspect, the sending packet may be a PDCP packet, an RLC packet or a MAC packet.

In combination with the second aspect or any abovementioned possible implementation mode thereof, in a second possible implementation mode of the second aspect, the time indication information may include a starting time of processing the sending packet by the transmitter.

The method may further include that: the receiver determines an ending time of processing the sending packet by the transmitter.

The operation that the receiver determines the latency from the transmitter to the receiver may include the following action.

The latency from the transmitter to the receiver is determined according to a difference between the ending time and the starting time.

In combination with the second aspect or any abovementioned possible implementation mode thereof, in a third possible implementation mode of the second aspect, the time indication information may include a processing latency of processing the sending packet by the transmitter, a processing latency of processing the sending packet by an intermediate node between the transmitter and the receiver and a transmission latency between the intermediate node and a previous node of the intermediate node, the transmission latency being acquired by the any intermediate node.

The method may further include that: the receiver determines a processing latency of processing the sending packet by the receiver and a transmission latency between the receiver and a previous node of the receiver.

The operation that the receiver determines the latency from the transmitter to the receiver may include the following action.

The latency from the transmitter to the receiver is determined according to a sum of the processing latency of processing the sending packet by the transmitter, the processing latency of processing the sending packet by the intermediate node between the transmitter and the receiver, the transmission latency between the intermediate node and the previous node of the intermediate node, the processing latency of processing the sending packet by the receiver and the transmission latency between the receiver and the previous node of the receiver.

In combination with the third possible implementation mode of the second aspect, in a fourth possible implementation mode of the second aspect, processing latency of processing the sending packet by different nodes may be carried in different information fields of the sending packet, transmission latency between different nodes and respective previous nodes of the different nodes may be carried in different information fields of the sending packet, and the processing latency and the transmission latency acquired by the same node may be carried in different information fields of the sending packet.

In combination with the second aspect or any abovementioned possible implementation mode thereof, in a fifth possible implementation mode of the second aspect, the time indication information may include the processing latency of processing the sending packet by the transmitter and a sum of the processing latency of processing the sending packet by the intermediate node between the transmitter and the receiver and an acquired transmission latency between the intermediate node and a previous node of the intermediate node.

The method may further include that: the receiver determines the processing latency of processing the sending packet by the receiver and the transmission latency between the receiver and the previous node of the receiver.

The operation that the receiver determines the latency from the transmitter to the receiver may include the following action.

The latency from the transmitter to the receiver is determined according to a sum of the processing latency of processing the sending packet by the transmitter, the sum of the processing latency of processing the sending packet by the intermediate node and the acquired transmission latency between the intermediate node and the previous node of the intermediate node, the processing latency of processing the sending packet by the receiver and the transmission latency between the receiver and the previous node of the receiver.

In combination with the fifth possible implementation mode of the second aspect, in a sixth possible implementation mode of the second aspect, sums of the processing latency of processing the sending packet by different nodes and the acquired transmission latency between different nodes and respective previous nodes of the different nodes may be carried in different information fields of the sending packet.

In combination with the second aspect or any abovementioned possible implementation mode thereof, in a seventh possible implementation mode of the second aspect, the time indication information may include a sum of the processing latency of processing the sending packet by the transmitter, the processing latency of processing the sending packet by the intermediate node between the transmitter and the receiver and the transmission latency between the intermediate node and a previous node of the intermediate node.

The method may further include that: the receiver determines the processing latency of processing the sending packet by the receiver and the transmission latency between the previous node of the receiver and the receiver.

The operation that the receiver determines the latency from the transmitter to the receiver may include the following action.

The latency from the transmitter to the receiver is determined according to a sum of the processing latency of processing the sending packet by the transmitter, the transmission latency between the previous node of the receiver and the receiver, and the sum of the processing latency of processing the sending packet by the transmitter, the processing latency of processing the sending packet by the intermediate node between the transmitter and the receiver and the transmission latency between the intermediate node and the previous node of the intermediate node.

In combination with the second aspect or any abovementioned possible implementation mode thereof, in an eighth possible implementation mode of the second aspect, the latency may include a synchronization time offset between the transmitter and the receiver.

In combination with the second aspect or any abovementioned possible implementation mode thereof, in a ninth possible implementation mode of the second aspect, the receiver may calculate the synchronization time offset between the transmitter and the receiver according to synchronization time offsets of adjacent nodes prior to the receiver and a synchronization time offset between the previous node of the receiver and the receiver, wherein the synchronization time offsets may be recorded in the time indication information.

In combination with the second aspect or any abovementioned possible implementation mode thereof, in a tenth possible implementation mode of the second aspect, the operation that the receiver receives the sending packet sent by the transmitter may include that: the sending packet sent by the transmitter through multiple paths is received.

The operation that the receiver determines the latency from the transmitter to the receiver may include the following action.

A latency of each of the multiple paths from the transmitter to the receiver is determined.

In combination with the second aspect or any abovementioned possible implementation mode thereof, in an eleventh possible implementation mode of the second aspect, the method may further include the following actions.

The receiver determines whether the latency from the transmitter to the receiver meets a latency requirement and transmits a feedback message to the transmitter or a third-party entity, wherein the feedback message may be configured to indicate whether the latency from the transmitter to the receiver meets the latency requirement.

Alternatively, the receiver transmits the latency to the transmitter or the third party.

In combination with the second aspect or any abovementioned possible implementation mode thereof, in a twelfth possible implementation mode of the second aspect, the sending packet may further include at least one of the latency requirement, a receiver list or a feedback object.

In combination with the second aspect or any abovementioned possible implementation mode thereof, in a thirteenth possible implementation mode of the second aspect, the operation that the receiver receives the sending packet sent by the transmitter may include the following action.

The sending packet is received through a Uu interface or a D2D interface.

A third aspect provides a communication method, which may include the following operations.

A communication node receives a sending packet a transmitter, wherein the sending packet may be sent to a receiver.

The communication node adds a processing latency of processing the sending packet and a transmission latency between a previous node and the communication node into the sending packet.

The communication node transmits the sending packet to the receiver.

In combination with the third aspect, in a first possible implementation mode of the third aspect, the method may further include the following operations.

Responsive to determining that the previous node of the communication node is asynchronous with the communication node, a synchronization time offset between the communication node and the previous node is determined.

The synchronization time offset is added into the sending packet.

In combination with the third aspect or the first possible implementation mode thereof, in a second possible implementation mode of the third aspect, the operation that the communication node adds the processing latency of processing the sending packet into the sending packet may include the following actions, The communication node adds the processing latency and the transmission latency acquired by the communication node into information fields, wherein the information fields may be different from information fields including a processing latency and a transmission latency added by other node, and the processing latency and the transmission latency added by the communication node may be located in different information fields.

Alternatively, a sum of the processing latency and the transmission latency acquired by the communication node is added into an information field, wherein the information field may be different from an information field including a sum of the processing latency and the transmission latency added by other node.

Alternatively, the sum of the processing latency and the transmission latency is added by accumulating a time value indicated by the time indication information in the sending packet, wherein the time value indicated by the time indication information may represent a sum of a processing latency of processing the sending packet by the transmitter, a processing latency of processing the sending packet by an intermediate node between the transmitter and the communication node and a transmission latency between the transmitter and the previous node of the communication node.

A fourth aspect provides a communication device, which is configured to execute the method in the first aspect or any possible implementation mode of the first aspect. Specifically, the communication device includes units configured to execute the method in the first aspect or any possible implementation mode of the first aspect.

A fifth aspect provides a communication device, which is configured to execute the method in the second aspect or any possible implementation mode of the second aspect. Specifically, the communication device includes units configured to execute the method in the second aspect or any possible implementation mode of the second aspect.

A sixth aspect provides a communication device, which is configured to execute the method in the third aspect or any possible implementation mode of the third aspect. Specifically, the communication device includes units configured to execute the method in the third aspect or any possible implementation mode of the third aspect.

A seventh aspect provides a communication device, which includes a memory and a processor. The memory is configured to store an instruction, and the processor is configured to execute the instruction stored in the memory. When the processor executes the instruction stored in the memory, such execution enables the processor to execute the method in the first aspect or any possible implementation mode of the first aspect.

An eighth aspect provides a communication device, which includes a memory and a processor. The memory is configured to store an instruction, and the processor is configured to execute the instruction stored in the memory. When the processor executes the instruction stored in the memory, such execution enables the processor to execute the method in the second aspect or any possible implementation mode of the second aspect.

A ninth aspect provides a communication device, which includes a memory and a processor. The memory is configured to store an instruction, and the processor is configured to execute the instruction stored in the memory. When the processor executes the instruction stored in the memory, such execution enables the processor to execute the method in the third aspect or any possible implementation mode of the third aspect.

A tenth aspect provides a computer storage medium, in which a program code is stored. The program code may be configured to instruct the method in the first aspect or any possible implementation mode of the first aspect to be executed.

An eleventh aspect provides a computer storage medium, in which a program code is stored. The program code may be configured to instruct the method in the second aspect or any possible implementation mode of the second aspect to be executed.

A twelfth aspect provides a computer storage medium, in which a program code is stored. The program code may be configured to instruct the method in the third aspect or any possible implementation mode of the third aspect to be executed.

Therefore, in the embodiments of the disclosure, the time indication information is added into the sending packet, such that the latency from the transmitter to the receiver may be acquired accurately.

BRIEF DESCRIPTION OF DRAWINGS

In order to describe the technical solutions of the embodiments of the disclosure more clearly, the drawings required to be used in descriptions about the embodiments or a conventional art will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

It should be understood that the technical solutions of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a Universal Mobile Telecommunication System (UMTS) and a system in 5th-Generation (5G).

In some embodiments, Device to Device (D2D) communication may refer to Vehicle to Vehicle (V2V) communication or Vehicle to X (V2X) communication. In V2X communication, X may generally refer to any device with a wireless receiving and sending capability, for example, but not limited to, a wireless device moving at a low speed, vehicle-mounted equipment moving at a high speed or a network control node with a wireless transmitting and receiving capability. Of course, the embodiments of the disclosure may not be applied to D2D communication but communication between a terminal and a cellular network.

In the embodiments of the disclosure, a terminal device may also be called an access terminal, a user unit, a user station, a mobile radio station, a mobile station, a remote station, a remote terminal, a mobile device, a user terminal, a terminal, wireless communication device, a user agent or a user device. The access terminal may be a cell phone, a cordless phone, a Session Initiation Protocol (SIP) phone, a Wireless Local Loop (WLL) station, a Personal Digital Assistant (PDA), handheld equipment with a wireless communication function, a computing device, other processing device connected to a wireless modem, vehicle-mounted equipment, wearable equipment and a terminal device in a future 5G network. A network device may be configured to communicate with a mobile device. The network device may be a Base Transceiver Station (BTS) in the GSM or CDMA, may also be a NodeB (NB) in WCDMA, and may further be an Evolutional Node B (eNB or eNodeB) in LTE, or a relay station or an access point, or vehicle-mounted equipment, wearable equipment and a network device in the future 5G network.

Figure 1:
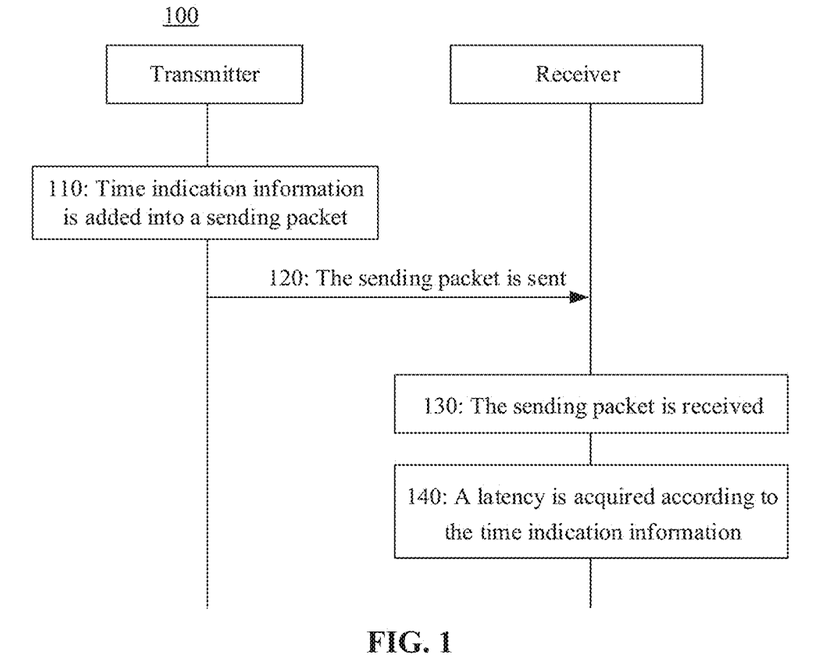
FIG. 1 is a schematic flowchart of a communication method according to an embodiment of the disclosure.

FIG. 1 is a schematic flowchart of a communication method 100 according to an embodiment of the disclosure.

As illustrated in FIG. 1, the communication method 100 includes operations at blocks 10, 120, 130 and 140.

In 110, a transmitter adds time indication information into a sending packet, wherein the time indication information is configured for a receiver to acquire latency from the transmitter to the receiver.

In at least one embodiment, the sending packet is a PDCP packet, an RLC packet or a MAC packet.

In at least one embodiment, the sending packet is a data packet or a probing packet dedicated for latency detection.

In 120, the transmitter transmits the sending packet to the receiver.

In at least one embodiment, the transmitter determines QoS of a service corresponding to the latency from the transmitter to the receiver to be acquired, and the transmitter transmits the sending packet to the receiver according to the corresponding QoS.

In 130, the receiver receives the sending packet sent by the transmitter, wherein the sending packet includes the time indication information.

In the example, the receiver parses the time indication information in the same layer where the transmitter adds the time indication information. For example, when the transmitter adds the time indication information in a MAC layer, the receiver parses the time indication information in the MAC layer.

In 140, the receiver determines the latency from the transmitter to the receiver according to the time indication information.

In at least one embodiment of the disclosure, the transmitter may transmit the sending packet through multiple paths, and the receiver receives the sending packet sent by the transmitter through the multiple paths and determines a latency of each of the multiple paths. In the example, path information of the corresponding paths may be included in the sending packet, or, an intermediate node through which the sending packet passes adds the path information of the paths into the packet.

In at least one embodiment of the disclosure, the time indication information included in the sending packet sent by the transmitter may include a starting time of processing the sending packet by the transmitter, and the receiver may determine the latency from the transmitter to the receiver according to a difference between an ending time of processing the sending packet and the starting time. In the example, the starting time of processing the sending packet by the transmitter refers to a time when the packet is obtained or a time when the packet is started to be generated, and the ending time of processing the sending packet by the receiver may refer to a time when parsing of the packet is completed.

In at least one embodiment, the starting time and the ending time may be absolute time, for example, absolute time corresponding to Coordinated Universal Time (UTC), Beidou and a Global Positioning System (GPS). Then the difference between the ending time and the starting time may directly be determined as the latency from the transmitter to the receiver.

The starting time and the ending time may not be absolute time, and for example, may be time defined by a communication system, such as, time represented by a subframe or a time slot. Then it is necessary to determine the latency from the transmitter to the receiver according to a synchronization time offset between the transmitter and the receiver and according to the difference between the ending time and the starting time.

In the example, the synchronization time offset of the transmitter and the receiver may be calculated according to a synchronization time offset between any two nodes between the transmitter and the receiver. When a previous node of the intermediate node is asynchronous with the intermediate node, the node may determine a synchronization time offset with the previous node and record the synchronization time offset in the sending packet.

For example, a node 1 and a node 2 exist between the transmitter and the receiver. The node 1, after receiving the sending packet, may acquire a synchronization time offset between the transmitter and the node 1 and record it in the sending packet. The node 2, after receiving the sending packet, may acquire a synchronization time offset between the node 1 and the node 2 and record it in the sending packet. In the example, the synchronization time offset between the node 1 and the node 2 may be accumulated with a previous synchronization time offset for recording in the sending packet, that is, the synchronization time offset between the node 1 and the node 2 is added to the previous synchronization time offset and the recorded synchronization time offset is changed into the added synchronization time offset. In an alternative example, the synchronization time offset between the node 1 and the node 2 may be independently recorded in an information field. The receiver, after receiving the sending packet, may acquire a synchronization time offset between the node 2 and the receiver and acquire a synchronization time offset between the transmitter and the node 2 according to records in the sending packet, so that the synchronization time offset between the transmitter and the receiver may be acquired.

In at least one embodiment, the transmitter may add a processing latency of processing the sending packet into the sending packet, and the intermediate node, after receiving the sending packet, may add a processing latency and a transmission latency with the previous node into the sending packet. The intermediate node may independently record the processing latency and the transmission latency in different information fields in the sending packet; or, the intermediate node may record a sum of the processing latency and transmission latency obtained by the intermediate node in an information field, but does not accumulate with time recorded by another node; or, the intermediate node may accumulate the processing latency with a processing latency obtained by the other node for recording in an information field and record the transmission latency and a transmission latency obtained by the other node in another information field; or, the intermediate node accumulates the sum of the transmission latency and the processing latency with a sum of the processing latency and transmission latency recorded in the sending packet and updates the records. After receiving the sending packet, the transmitter may obtain the latency between the transmitter and the receiver according to an indication of the time indication information in the sending packet.

For convenient understanding, some recording manners for the time indication information will be described below with some implementation modes as examples.

In an implementation mode, the time indication information includes the processing latency of processing the sending packet by the transmitter, includes a processing latency of processing the sending packet by any intermediate node between the transmitter and the receiver and includes a transmission latency between the intermediate node and the previous node of the intermediate node, the transmission latency being acquired by the any intermediate node. In the example, processing latency of processing the sending packet by different nodes are carried in different information fields of the sending packet, transmission latency acquired by different nodes are carried in different information fields of the sending packet, and the processing latency and transmission latency of the same node are carried in different information fields of the sending packet. Under this condition, the receiver determines a processing latency of processing the sending packet by the receiver and a transmission latency between the receiver and a previous node of the receiver. The latency from the transmitter to the receiver is determined according to a sum of the processing latency of processing the sending packet by the transmitter, the processing latency of processing the sending packet by any intermediate node, the transmission latency between the intermediate node and the previous node of the intermediate node that is acquired by the intermediate node, the processing latency of processing the sending packet by the receiver and the transmission latency between the receiver and the previous node of the receiver.

For example, the node 1 and the node 2 exist between the transmitter and the receiver, the processing latency (for example, 1 ms) of processing the sending packet by the transmitter is recorded in an information field. The node 1 receives the sending packet, acquires the transmission latency of 0.5 ms from the receiver to the node 1, acquires the processing latency of 1 ms of processing the sending packet, and records 0.5 ms and 1 ms in different information fields, respectively. The node 2 receives the sending packet, acquires the transmission latency of 0.6 ms from the node 1 to the node 2, acquires the processing latency of 1.1 ms of processing the sending packet, and records 0.6 ms and 1.1 ms in different information fields, respectively. The receiver receives the sending packet, acquires the transmission latency of 0.4 ms from the node 2 to the receiver and the processing latency of 1.2 ms of processing the sending packet, acquires 1 ms, 1 ms, 0.5 ms, 0.6 ms and 1.1 ms recorded in the sending packet, and adds 1 ms, 1 ms, 0.5 ms, 0.6 ms, 1.1 ms, 0.4 ms and 1.2 ms to obtain a time value for determining the latency from the transmitter to the receiver.

In an implementation mode, the time indication information includes the processing latency of processing the sending packet by the transmitter and includes a sum of the processing latency of processing the sending packet by any intermediate node between the transmitter and the receiver and the transmission latency between the intermediate node and a previous node of the intermediate node, wherein sums of the processing latency of processing the sending packet by different nodes and the acquired transmission latency are carried in different information fields of the sending packet. Under this condition, the receiver determines the processing latency of processing the sending packet by the receiver and the transmission latency between the receiver and the previous node of the receiver; The latency from the transmitter to the receiver is determined according to a sum of the processing latency of processing the sending packet by the transmitter, the sum of the processing latency of processing the sending packet by the intermediate node between the transmitter and the receiver and the acquired transmission latency between the intermediate node and the previous node of the intermediate node, the processing latency of processing the sending packet by the receiver and the transmission latency between the receiver and the previous node of the receiver.

For example, the node 1 and the node 2 exist between the transmitter and the receiver. The processing latency (for example, 1 ms) of processing the sending packet by the transmitter is recorded in an information field, and the node 1 receives the sending packet, acquires the transmission latency of 0.5 ms from the receiver to the node 1, acquires the processing latency of 1 ms of processing the sending packet and records 1.5 ms in the information field. The node 2 receives the sending packet, acquires the transmission latency of 0.6 ms from the node 1 to the node 2, acquires the processing latency of 1.1 ms of processing the sending packet and records 1.7 ms in an information field that is different from the transmitter. The receiver receives the sending packet, acquires the transmission latency of 0.4 ms from the node 2 to the receiver and the processing latency of 1.2 ms of processing the sending packet, acquires 1 ms, 1.5 ms and 1.7 ms recorded in the sending packet and adds 1 ms, 1.5 ms, 1.7 ms, 0.4 ms and 1.2 ms to obtain a time value for determining the latency from the transmitter to the receiver.

In an implementation mode, the time indication information includes a sum of the processing latency of processing the sending packet by the transmitter, the processing latency of processing the sending packet by an intermediate node between the transmitter and the receiver and the transmission latency between the intermediate node and a previous node of the intermediate node. The receiver determines the processing latency of processing the sending packet by the receiver and the transmission latency between the previous node of the receiver and the receiver. The latency from the transmitter to the receiver is determined according to a sum of the processing latency of processing the sending packet by the receiver, the transmission latency between the previous node of the receiver and the receiver and the sum of the processing latency of processing the sending packet by the transmitter, the processing latency of processing the sending packet by the intermediate node between the transmitter and the receiver and the transmission latency between the intermediate node and the previous node of the intermediate node.

For example, the node 1 and the node 2 exist between the transmitter and the receiver. The processing latency (for example, 1 ms) of processing the sending packet by the transmitter is recorded in an information field, and the node 1 receives the sending packet, acquires the transmission latency of 0.5 ms from the receiver to the node 1, acquires the processing latency of 1 ms of processing the sending packet and updates 1 ms recorded by the transmitter into 2.5 ms. The node 2 receives the sending packet, acquires the transmission latency of 0.6 ms from the node 1 to the node 2, acquires the processing latency of 1.1 ms of processing the sending packet and updates 2.5 ms recorded by the node 1 into 4.2 ms. The receiver receives the sending packet, acquires the transmission latency of 0.4 ms from the node 2 to the receiver and the processing latency of 1.2 ms of processing the sending packet, acquires 14.2 recorded in the sending packet and adds 4.2 ms, 0.4 ms and 1.2 ms to obtain a time value for determining the latency from the transmitter to the receiver.

When at least one of the processing latency or transmission latency acquired by each node is not obtained through absolute time, it is also necessary to acquire the synchronization time offset between the transmitter and the receiver, wherein the synchronization time offset between the transmitter and the receiver may be calculated according to the synchronization time offset between any two nodes between the transmitter and the receiver. When the previous node of the intermediate node is asynchronous with the intermediate node, the node may determine the synchronization time offset with the previous node and record the synchronization time offset in the sending packet.

In the example, when recording the synchronization time offset with the previous node in the sending packet, each node may independently record it and may also record it in combination with at least one of the processing latency or the transmission latency.

In at least one embodiment, the sending packet further includes at least one of a latency requirement, a receiver list or a feedback object.

In the example, when the sending packet includes the latency requirement, the receiver may determine whether the latency meets the latency requirement and feed back to the feedback object whether the latency from the transmitter to the receiver meets the latency requirement.

In the example, when the sending packet does not include the latency requirement, the receiver may directly feed back the latency from the transmitter to the receiver to the feedback object. In an alternative example, according to the latency requirement acquired in another manner (for example, a latency requirement configured by a network device), the receiver may determine whether the latency meets the latency requirement and feed back to the feedback object whether the latency from the transmitter to the receiver meets the latency requirement.

In the example, the feedback object of the latency may be the transmitter and may also be a third-party entity, for example, the network device.

In at least one embodiment, the transmitter receives configuration information sent by the third-party entity. The configuration information is configured to instruct the transmitter to transmit the sending packet including the time indication information to the receiver.

In at least one embodiment, the transmitter transmits the sending packet to the receiver through a Uu interface or a D2D interface.

Therefore, in the embodiment of the disclosure, the time indication information is added into the sending packet, such that the latency from the transmitter to the receiver is acquired accurately.

Figure 2:
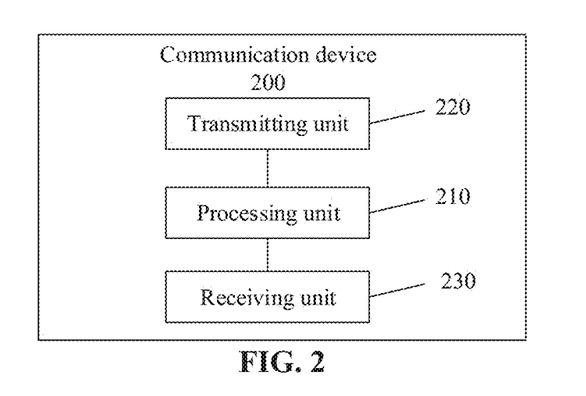
FIG. 2 is a schematic block diagram of a communication device according to an embodiment of the disclosure.

FIG. 2 is a schematic block diagram of a communication device 200 according to an embodiment of the disclosure. As illustrated in FIG. 2, the communication device includes a processing unit 210 and a transmitting unit 220. The processing unit 210 adds time indication information into a sending packet, wherein the time indication information is configured for a receiver to acquire latency from the communication device 200 to the receiver. The transmitting unit 220 is configured to transmit the sending packet to the receiver.

In at least one embodiment, the sending packet may be a PDCP packet, an RLC packet or a MAC packet.

In at least one embodiment, the time indication information may include a starting time of processing the sending packet by the communication device 200 or includes a processing latency of processing the sending packet by the communication device 200.

In at least one embodiment, the processing unit 210 may further be configured to determine QoS of a service corresponding to the latency from the communication device 200 to the receiver to be acquired. The transmitting unit 220 may be specifically configured to transmit the sending packet to the receiver according to the corresponding QoS.

In at least one embodiment, the transmitting unit 220 may be specifically configured to: transmit the sending packet to the receiver through multiple paths.

In at least one embodiment, the sending packet is a data packet or a probing packet dedicated for latency detection.

In at least one embodiment, the sending packet further includes at least one of a latency requirement, a receiver list or a feedback object.

In at least one embodiment, as illustrated in FIG. 2, the communication device 200 further includes a receiving unit 230. The receiving unit 230 may be configured to: receive a feedback message of the receiver, wherein the feedback message may be configured to indicate the latency from the communication device 200 to the receiver or configured to indicate whether the latency from the communication device 200 to the receiver meets the latency requirement.

In at least one embodiment, as illustrated in FIG. 2, the communication device 200 further includes a receiving unit 230. The receiving unit 230 may be configured to: receive configuration information sent by a third-party entity, wherein the configuration information may be configured to instruct the communication device 200 to transmit the sending packet including the time indication information to the receiver.

In at least one embodiment, the transmitting unit 220 may be specifically configured to transmit the sending packet to the receiver through a Uu interface or a D2D interface.

It should be understood that the communication device 200 may correspond to the abovementioned transmitter, may realize corresponding functions of the transmitter and will not be elaborated herein for simplicity.

Figure 3:
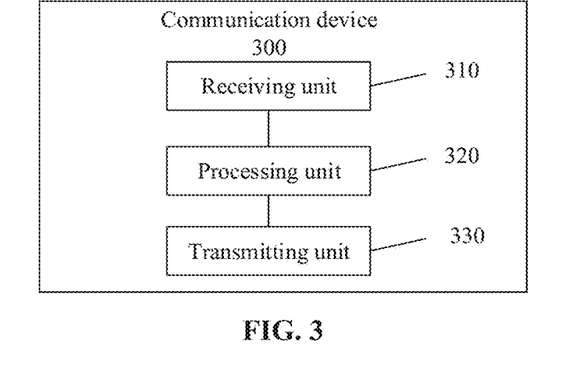
FIG. 3 is a schematic block diagram of a communication device according to an embodiment of the disclosure.

FIG. 3 is a schematic block diagram of a communication device 300 according to an embodiment of the disclosure. As illustrated in FIG. 3, the communication device 300 includes a receiving unit 310 and a processing unit 320. The receiving unit 310 is configured to receive a sending packet sent by a transmitter, wherein the sending packet includes time indication information. The processing unit 320 is configured to determine latency from the transmitter to the communication device 300 according to the time indication information.

In at least one embodiment, the sending packet is a PDCP packet, an RLC packet or a MAC packet.

In at least one embodiment, the time indication information includes a starting time of processing the sending packet by the transmitter. The processing unit 320 may be specifically configured to determine an ending time of processing the sending packet by the transmitter and determine the latency from the transmitter to the communication device 300 according to a difference between the ending time and the starting time.

In at least one embodiment, the time indication information may include a processing latency of processing the sending packet by the transmitter, include a processing latency of processing the sending packet by any intermediate node between the transmitter and the communication device 300 and include a transmission latency between the intermediate node and a previous node of the intermediate node, the transmission latency being acquired by the intermediate node.

The processing unit 320 may be specifically configured to determine a processing latency of processing the sending packet by the communication device 300 and a transmission latency between the communication device 300 and a previous node of the communication device 300, and determine the latency from the transmitter to the communication device 300 according to a sum of the processing latency of processing the sending packet by the transmitter, the processing latency of processing the sending packet by the intermediate node between the transmitter and the communication device 300, the transmission latency between the intermediate node and the previous node of the intermediate node, the processing latency of processing the sending packet by the communication device 300 and the transmission latency between the communication device 300 and the previous node of the communication device 300.

In at least one embodiment, processing latency of processing the sending packet by different nodes may be carried in different information fields of the sending packet, and transmission latency between different nodes and respective previous nodes of the different nodes may be carried in different information fields of the sending packet. The processing latency and the transmission latency acquired by the same node may be carried in different information fields of the sending packet.

In at least one embodiment, the time indication information may include the processing latency of processing the sending packet by the transmitter and include a sum of the processing latency of processing the sending packet by an intermediate node between the transmitter and the communication device 300 and the acquired transmission latency between the intermediate node and a previous node of the intermediate node.

The processing unit 320 may be specifically configured to determine the processing latency of processing the sending packet by the communication device 300 and the transmission latency between the communication device 300 and the previous node of the communication device 300, and determine the latency from the transmitter to the communication device 300 according to a sum of the processing latency of processing the sending packet by the transmitter, the sum of the processing latency of processing the sending packet by the intermediate node and the acquired transmission latency between the intermediate node and the previous node of the intermediate node, the processing latency of processing the sending packet by the communication device 300 and the transmission latency between the communication device 300 and the previous node of the communication device 300.

In at least one embodiment, sums of the processing latency of processing the sending packet by different nodes and the acquired transmission latency between different nodes and respective previous nodes of the different nodes may be carried in different information fields of the sending packet.

In at least one embodiment, the time indication information may include a sum of the processing latency of processing the sending packet by the transmitter, the processing latency of processing the sending packet by an intermediate node between the transmitter and the communication device 300 and the transmission latency between the intermediate node and a previous node of the intermediate node.

The processing unit 320 may be specifically configured to determine the processing latency of processing the sending packet by the communication device 300 and the transmission latency between the previous node of the communication device 300 and the communication device 300, and determine the latency from the transmitter and the communication device 300 according to a sum of the processing latency of processing the sending packet by the transmitter, the transmission latency between the previous node of the communication device 300 and the communication device 300, and the sum of the processing latency of processing the sending packet by the transmitter, the processing latency of processing the sending packet by the intermediate node between the transmitter and the communication device 300 and the transmission latency between the intermediate node and the previous node of the intermediate node.

In at least one embodiment, the latency may include a synchronization time offset between the transmitter and the communication device 300.

In at least one embodiment, the processing unit 320 may further be configured to: calculate the synchronization time offset between the transmitter and the communication device 300 according to synchronization time offsets of adjacent nodes prior to the communication device 300 and a synchronization time offset between the previous node of the communication device 300 and the communication device 300. The synchronization time offsets may be recorded in the time indication information.

In at least one embodiment, the receiving unit 310 may be specifically configured to receive the sending packet sent by the transmitter through multiple paths.

The processing unit 320 may be specifically configured to determine latency of each path in the multiple paths from the transmitter to the communication device 300.

In at least one embodiment, as illustrated in FIG. 3, the device may further a transmitting unit 330.

The processing unit 320 may further be configured to determine whether the latency from the transmitter to the communication device 300 meets a latency requirement. The transmitting unit 330 may be configured to transmit a feedback message to the transmitter or a third-party entity, wherein the feedback message may be configured to indicate whether the latency from the transmitter to the communication device 300 meets the latency requirement.

Alternatively, the transmitting unit 330 may be configured to transmit the latency to the transmitter or the third party.

In at least one embodiment, the sending packet further includes at least one of the latency requirement, a communication device 300 list or a feedback object.

In at least one embodiment, the receiving unit 310 is specifically configured to: receive the sending packet through a Uu interface or a D2D interface.

It should be understood that the communication device 300 may correspond to the abovementioned receiver, may realize corresponding functions of the receiver and will not be elaborated herein for simplicity.

Figure 4:
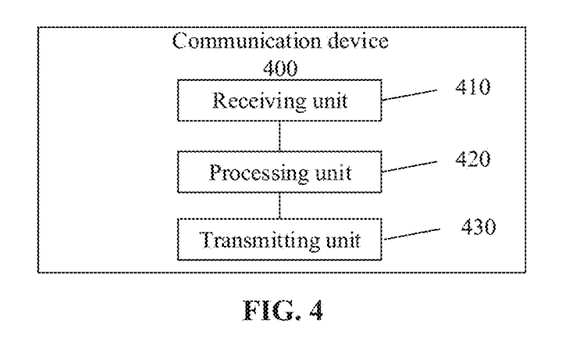
FIG. 4 is a schematic block diagram of a communication device according to an embodiment of the disclosure.

FIG. 4 is a schematic block diagram of a communication device 400 according to an embodiment of the disclosure. As illustrated in FIG. 4, the communication device 400 includes a receiving unit 410, a processing unit 420 and a transmitting unit 430. The receiving unit 410 is configured to receive a sending packet from a transmitter, wherein the sending packet is sent to a receiver. The processing unit 420 is configured to add a processing latency of processing the sending packet and a transmission latency between a previous node and the communication device into the sending packet. The transmitting unit 430 is configured to transmit the sending packet to the receiver.

In at least one embodiment, the processing unit 420 may further be configured to, responsive to determining that the previous node of the communication device is asynchronous with the communication device, determine a synchronization time offset between the communication device and the previous node and add the synchronization time offset into the sending packet.

In at least one embodiment, the processing unit 420 may be specifically configured to: add the processing latency and the transmission latency acquired by the communication device into information fields, wherein the information fields may be different from information fields including a processing latency and a transmission latency added by other node, and the processing latency and transmission the latency added by the communication device may be located in different information fields; or add a sum of the processing latency and the transmission latency acquired by the communication device into an information field, wherein the information field may be different from an information field including a sum of the processing latency and the transmission latency added by other node; or add the sum of the processing latency and the transmission latency by accumulating a time value indicated by the time indication information in the sending packet, wherein the time value indicated by the time indication information may represent a sum of a processing latency of processing the sending packet by the transmitter, a processing latency of processing the sending packet by an intermediate node between the transmitter and the communication device and a transmission latency between the transmitter and the previous node of the communication device.

It should be understood that the communication device 400 may correspond to the abovementioned intermediate node, may realize corresponding functions of the intermediate node and will not be elaborated herein for simplicity.

Figure 5:
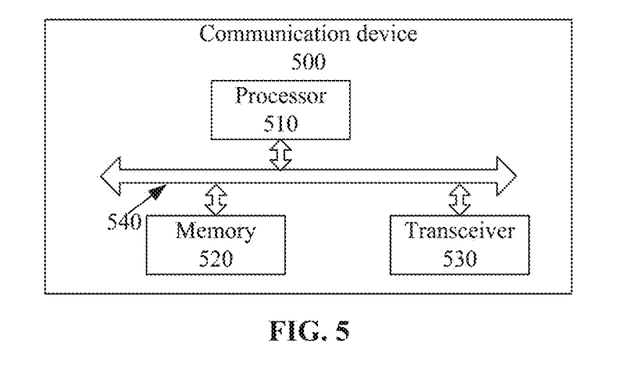
FIG. 5 is a schematic block diagram of a communication device according to an embodiment of the disclosure.

FIG. 5 is a schematic block diagram of a communication device 500 according to an embodiment of the disclosure. As illustrated in FIG. 5, the communication device 500 includes a processor 510, a memory 520 and a transceiver 530. In at least one embodiment, the communication device further includes a bus system 540, and the bus system is configured to interconnect the processor 510, the memory 520 and the transceiver 530. The memory 520 is configured to store an instruction, and the processor 510 is configured to call the instruction stored in the memory 520 to execute corresponding operations.

In at least one embodiment, the communication device 500 illustrated in FIG. 5 may execute corresponding operations of a transmitter mentioned in the embodiments of the disclosure, or may execute corresponding operations of a receiver mentioned in the embodiments of the disclosure or may execute corresponding operations of an intermediate node mentioned in the embodiments of the disclosure.

For convenient understanding, descriptions will be made below with execution of the corresponding operations of the transmitter by the communication device 500.

The processor 510 calls a code in the memory 520 to execute the following operations: adding time indication information into a sending packet, wherein the time indication information is configured for a receiver to acquire latency from the transmitter to the receiver, and transmitting the sending packet to the receiver through the transceiver 530.

In at least one embodiment, the sending packet is a PDCP packet, an RLC packet or a MAC packet.

In at least one embodiment, the time indication information includes a starting time of processing the sending packet by the transmitter or includes a processing latency of processing the sending packet by the transmitter.

In at least one embodiment, the processor 510 calls the code in the memory 520 to specifically execute the following operations: determining QoS of a service corresponding to the latency from the transmitter to the receiver to be acquired, and transmitting, the sending packet to the receiver according to the corresponding QoS through the transceiver 530.

In at least one embodiment, the processor 510 calls the code in the memory 520 to specifically execute the following operation: transmitting the sending packet to the receiver through multiple paths by the transceiver 530.

In at least one embodiment, the sending packet is a data packet or a probing packet dedicated for latency detection.

In at least one embodiment, the sending packet further includes at least one of a latency requirement, a receiver list or a feedback object.

In at least one embodiment, the processor 510 calls the code in the memory 520 to specifically execute the following operation: receiving a feedback message of the receiver through the transceiver 530, wherein the feedback message is configured to indicate the latency from the transmitter to the receiver or configured to indicate whether the latency from the transmitter to the receiver meets the latency requirement.

In at least one embodiment, the processor 510 calls the code in the memory 520 to specifically execute the following operation: receiving configuration information sent by a third-party entity through the transceiver 530, wherein the configuration information is configured to instruct the transmitter to send the transmitting packet including the time indication information to the receiver.

In at least one embodiment, the processor 510 calls the code in the memory 520 to specifically execute the following operation: transmitting the sending packet to the receiver through a Uu interface or a D2D interface by the transceiver 530.

Descriptions will be made below with execution of the corresponding operations of the receiver by the communication device 500.

The processor 510 calls the code in the memory 520 to execute the following operations: receiving a sending packet sent by a transmitter through the transceiver 530, wherein the sending packet includes time indication information, and determining latency from the transmitter to the receiver according to the time indication information.

In at least one embodiment, the sending packet is a PDCP packet, an RLC packet or a MAC packet.

In at least one embodiment, the time indication information includes a starting time of processing the sending packet by the transmitter.

The processor 510 calls the code in the memory 520 to execute the following operations: determining an ending time of processing the sending packet by the transmitter and determining the latency from the transmitter to the receiver according to a difference between the ending time and the starting time.

In at least one embodiment, the time indication information includes a processing latency of processing the sending packet by the transmitter, includes a processing latency of processing the sending packet by any intermediate node between the transmitter and the receiver and includes a transmission latency between the intermediate node and a previous node of the intermediate node, the transmission latency being acquired by the intermediate node.

The processor 510 calls the code in the memory 520 to execute the following operations: determining a processing latency of processing the sending packet by the receiver and a transmission latency between the receiver and a previous node of the receiver, and determining the latency from the transmitter to the receiver according to a sum of the processing latency of processing the sending packet by the transmitter, the processing latency of processing the sending packet by the intermediate node between the transmitter and the receiver, the transmission latency between the intermediate node and the previous node of the intermediate node, the processing latency of processing the sending packet by the receiver and the transmission latency between the receiver and the previous node of the receiver.

In at least one embodiment, processing latency of processing the sending packet by different nodes are carried in different information fields of the sending packet, transmission latency between different nodes and respective previous nodes of the different nodes are carried in different information fields of the sending packet, and the processing latency and transmission latency acquired by the same node are carried in different information fields of the sending packet.

In at least one embodiment, the time indication information includes the processing latency of processing the sending packet by the transmitter and includes a sum of the processing latency of processing the sending packet by an intermediate node between the transmitter and the receiver and an acquired transmission latency between the intermediate node and a previous node of the intermediate node.

The processor 510 calls the code in the memory 520 to execute the following operations: determining the processing latency of processing the sending packet by the receiver and the transmission latency between the receiver and the previous node of the receiver, and determining the latency from the transmitter to the receiver according to a sum of the processing latency of processing the sending packet by the transmitter, the sum of the processing latency of processing the sending packet by the intermediate node and the acquired transmission latency between the intermediate node and the previous node of the intermediate node, the processing latency of processing the sending packet by the receiver and the transmission latency between the receiver and the previous node of the receiver.

In at least one embodiment, sums of the processing latency of processing the sending packet by different nodes and the acquired transmission latency between different nodes and respective previous nodes of the different nodes are carried in different information fields of the sending packet.

In at least one embodiment, the time indication information includes a sum of the processing latency of processing the sending packet by the transmitter, the processing latency of processing the sending packet by an intermediate node between the transmitter and the receiver and the transmission latency between the intermediate node and a previous node of the intermediate node.

The processor 510 calls the code in the memory 520 to execute the following operations: determining the processing latency of processing the sending packet by the receiver and the transmission latency between the previous node of the receiver and the receiver, and determining the latency from the transmitter to the receiver according to a sum of the processing latency of processing the sending packet by the transmitter, the transmission latency between the previous node of the receiver and the receiver and the sum of the processing latency of processing the sending packet by the transmitter, the processing latency of processing the sending packet by the intermediate node between the transmitter and the receiver and the transmission latency between the intermediate node and the previous node of the intermediate node.

In at least one embodiment, the latency includes a synchronization time offset between the transmitter and the receiver.

In at least one embodiment, the processor 510 calls the code in the memory 520 to execute the following operation: calculating the synchronization time offset between the transmitter and the receiver according to synchronization time offsets of adjacent nodes prior to the receiver and a synchronization time offset between the previous node of the receiver and the receiver, wherein the synchronization time offsets are recorded in the time indication information.

In at least one embodiment, the processor 510 calls the code in the memory 520 to execute the following operation: receiving, by the receiver, the sending packet sent by the transmitter, including: receiving the sending packet sent by the transmitter through multiple paths by the transceiver 530, and determining latency of each of the multiple paths from the transmitter to the receiver.

In at least one embodiment, the processor 510 calls the code in the memory 520 to execute the following operations: determining whether the latency from the transmitter to the receiver meets a latency requirement and transmitting a feedback message to the transmitter or a third-party entity through the transceiver 530, wherein the feedback message is configured to indicate whether the latency from the transmitter to the receiver meets the latency requirement; or transmitting the latency to the transmitter or the third party through the transceiver 530.

In at least one embodiment, the sending packet further includes at least one of the latency requirement, a receiver list or a feedback object.

In at least one embodiment, the processor 510 calls the code in the memory 520 to execute the following operation: receiving the sending packet through a Uu interface or a D2D interface through the transceiver 530.

Descriptions will be made below with execution of the corresponding operations of the intermediate node by the communication device 500.

The processor 510 calls the code in the memory 520 to execute the following operations: receiving a sending packet from a transmitter through the transceiver 530, wherein the sending packet is sent to a receiver; adding a processing latency of processing the sending packet and a transmission latency between a previous node and the intermediate node into the sending packet; and transmitting the sending packet to the receiver through the transceiver 530.

In at least one embodiment, the processor 510 calls the code in the memory 520 to execute the following operations: responsive to determining that the previous node of the intermediate node is asynchronous with the intermediate node, determining a synchronization time offset between the intermediate node and the previous node and adding the synchronization time offset into the sending packet.

In at least one embodiment, the processor 510 calls the code in the memory 520 to execute the following operation: adding the processing latency and transmission latency acquired by the intermediate node into information fields, wherein the information fields are different from information fields including a processing latency and a transmission latency added by other node, and the processing latency and transmission latency added by the communication node are located in different information fields; or adding a sum of the processing latency and transmission latency acquired by the communication node into an information field, wherein the information field is different from an information field including a sum of the processing latency and the transmission latency added by other node; or adding the sum of the processing latency and the transmission latency by accumulating a time value indicated by the time indication information in the sending packet, wherein the time value indicated by the time indication information represents a sum of a processing latency of processing the sending packet by the transmitter, a processing latency of processing the sending packet by an intermediate node between the transmitter and the communication node and a transmission latency between the transmitter and the previous node of the communication node.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, network equipment or the like) to execute all or part of the operations of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A communication method, comprising:
adding, by a transmitter, time indication information into a sending packet, wherein the time indication information is configured for a receiver to acquire a latency from the transmitter to the receiver; and transmitting, by the transmitter, the sending packet to the receiver, wherein the time indication information comprises a processing latency of processing the sending packet by the transmitter, and the sending packet further comprises a latency requirement; wherein the method further comprises:

receiving, by the transmitter, a feedback message from the receiver, wherein the feedback message is configured to indicate whether the latency from the transmitter to the receiver meets latency requirement.

2. The method according to claim 1, wherein the sending packet is a Packet Data Convergence Protocol (PDCP) packet, a Radio Link Control (RLC) packet or a Media Access Control (MAC) packet; or the sending packet is a data packet or a probing packet dedicated for latency detection.

3. The method according to claim 1, wherein the time indication information further comprises a starting time of processing the sending packet by the transmitter.

4. The method according to claim 1, before transmitting, by the transmitter, the sending packet to the receiver, further comprising:

determining, by the transmitter, Quality of Service (QoS) of a service corresponding to the latency from the transmitter to the receiver to be acquired;

wherein transmitting, by the transmitter, the sending packet to the receiver comprises:

transmitting, by the transmitter, the sending packet to the receiver according to the corresponding QoS.

5. The method according to claim 1, wherein transmitting, by the transmitter, the sending packet to the receiver comprises:

transmitting, by the transmitter, the sending packet to the receiver through multiple paths; or transmitting, by the transmitter, the sending packet to the receiver through a Uu interface or a Device to Device (D2D) interface.

6. The method according to claim 1, wherein the sending packet further comprises at least one of a feedback object or a receiver list.

7. The method according to claim 1, before adding, by the transmitter, the time indication information into the sending packet, further comprising:

receiving, by the transmitter, configuration information sent by a third-party entity, wherein the configuration information is configured to instruct the transmitter to send the sending packet comprising the time indication information to the receiver.

8. A communication method, comprising:

receiving, by a receiver, a sending packet sent by a transmitter, wherein the sending packet comprises time indication information and further comprises a latency requirement; and determining, by the receiver, a latency from the transmitter to the receiver according to the time indication information, wherein the time indication information comprises a processing latency of processing the sending packet by the transmitter, a processing latency of processing the sending packet by an intermediate node between the transmitter and the receiver and a transmission latency between the intermediate node and a previous node of the intermediate node acquired by the intermediate node;

the method further comprises: determining, by the receiver, a processing latency of processing the sending packet by the receiver and a transmission latency between the receiver and a previous node of the receiver;

the method further comprises: determining, by the receiver, whether the latency from the transmitter to the receiver meets latency requirement;

transmitting a feedback message to the transmitter, wherein the feedback message is configured to indicate whether the latency from the transmitter to the receiver meets the latency requirement.

9. The method according to claim 8, wherein the time indication information further comprises a starting time of processing the sending packet by the transmitter;

the method further comprises: determining, by the receiver, an ending time of processing the sending packet by the receiver; and determining, by the receiver, the latency from the transmitter to the receiver comprises:

determining the latency from the transmitter to the receiver according to a difference between the ending time and the starting time.

10. The method according to claim 8, wherein determining, by the receiver, the latency from the transmitter to the receiver comprises:

determining the latency from the transmitter to the receiver according to a sum of the processing latency of processing the sending packet by the transmitter, the processing latency of processing the sending packet by the intermediate node between the transmitter and the receiver, the transmission latency between the intermediate node and the previous node of the intermediate node, the processing latency of processing the sending packet by the receiver and the transmission latency between the receiver and the previous node of the receiver.

11. The method according to claim 10, wherein processing latency of processing the sending packet by each of the transmitter, the receiver and the intermediate node is carried in a respective information field of the sending packet, transmission latency between each of the receiver and the intermediate node and a respective previous node is carried in a respective information field of the sending packet, the transmission latency being acquired by each of the receiver and the intermediate node, and for each of receiver and the intermediate node, an information field of the sending packet for carrying the processing latency is different from an information field of the sending packet for carrying the transmission latency.

12. The method according to claim 8, wherein the time indication information further comprises a sum of the processing latency of processing the sending packet by the intermediate node between the transmitter and the receiver and the transmission latency between the intermediate node and the previous node of the intermediate node acquired by the intermediate node;

determining, by the receiver, the latency from the transmitter to the receiver comprises:

determining the latency from the transmitter to the receiver according to a sum of the processing latency of processing the sending packet by the transmitter, the sum of the processing latency of processing the sending packet by the intermediate node and the transmission latency between the intermediate node and the previous node of the intermediate node acquired by the intermediate node, the processing latency of processing the sending packet by the receiver and the transmission latency between the receiver and the previous node of the receiver;

wherein a sum of the following:

the processing latency of processing the sending packet by each of the transmitter, the receiver and the intermediate node, and the acquired transmission latency between the respective receiver or the intermediate node and a respective previous node is carried in a respective information field of the sending packet.

13. The method according to claim 8, wherein the time indication information further comprises a sum of the processing latency of processing the sending packet by the transmitter, the processing latency of processing the sending packet by the intermediate node between the transmitter and the receiver and the transmission latency between the intermediate node and the previous node of the intermediate node;

determining, by the receiver, the latency from the transmitter to the receiver comprises:

determining the latency from the transmitter to the receiver according to a sum of the processing latency of processing the sending packet by the receiver, the transmission latency between the previous node of the receiver and the receiver, and the sum of the processing latency of processing the sending packet by the transmitter, the processing latency of processing the sending packet by the intermediate node between the transmitter and the receiver and the transmission latency between the intermediate node and the previous node of the intermediate node.

14. The method according to claim 8, wherein the latency comprises a synchronization time offset between the transmitter and the receiver;

wherein the method further comprises:

calculating the synchronization time offset between the transmitter and the receiver according to synchronization time offsets of adjacent nodes prior to the receiver and a synchronization time offset between the previous node of the receiver and the receiver, wherein the synchronization time offsets are recorded in the time indication information.

15. The method according to claim 8, wherein receiving, by the receiver, the sending packet sent by the transmitter comprises:

receiving the sending packet sent by the transmitter through multiple paths;

determining, by the receiver, the latency from the transmitter to the receiver comprises:

determining a latency of each of the multiple paths from the transmitter to the receiver;

wherein the sending packet further comprises at least one of a feedback object or a receiver list.

16. A communication method, comprising:

receiving, by a communication node, a sending packet from a transmitter, wherein the sending packet is sent to a receiver, the sending packet comprises time indication information and further comprises a latency requirement, and the time indication information comprises a processing latency of processing the sending packet by the transmitter, and the communication node is an intermediate node between the transmitter and the receiver;

adding, by the communication node, a processing latency of processing the sending packet and a transmission latency between a previous node and the communication node into the time indication information of the sending packet; and transmitting, by the communication node, the sending packet to the receiver, wherein the method further comprises:

sending, by the communication node, a feedback message from the receiver to the transmitter, wherein the feedback message is configured to indicate whether the latency from the transmitter to the receiver meets latency requirement.

17. The method according to claim 16, further comprising:

responsive to determining that the previous node of the communication node is asynchronous with the communication node, determining a synchronization time offset between the communication node and the previous node; and adding the synchronization time offset into the sending packet.

18. The method according to claim 16, wherein adding, by the communication node, the processing latency of processing the sending packet into the sending packet comprises:

adding, by the communication node, the processing latency and the transmission latency acquired by the communication node into information fields, the information fields being different from information fields including a processing latency and a transmission latency added by other node, wherein the processing latency and transmission latency added by the communication node are located in different information fields; or adding a sum of the processing latency and the transmission latency acquired by the communication node into an information field, the information field being different from an information field including a sum of the processing latency and the transmission latency added by other node; or adding the sum of the processing latency and the transmission latency by accumulating a time value indicated by the time indication information in the sending packet, wherein the time value indicated by the time indication information represents a sum of a processing latency of processing the sending packet by the transmitter, a processing latency of processing the sending packet by an intermediate node between the transmitter and the communication node and a transmission latency between the transmitter and the previous node of the communication node.

\* \* \* \* \*